May 19, 1953 A. B. KLEINHANS 2,639,009
GREENHOUSE CONSTRUCTION
Filed Feb. 5, 1947 2 Sheets-Sheet 1
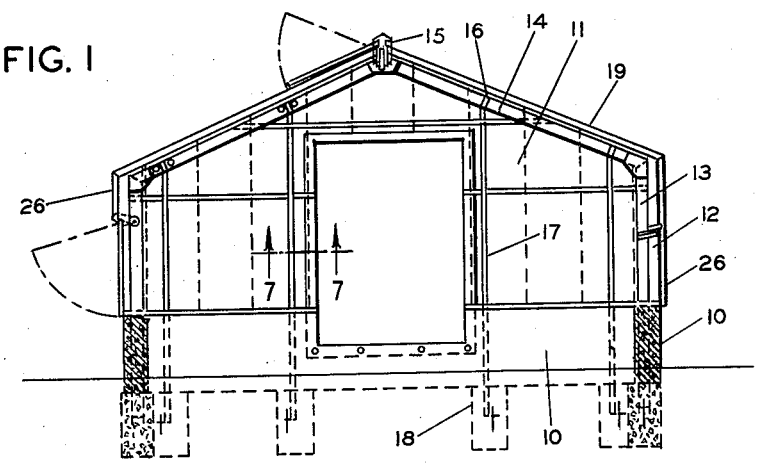
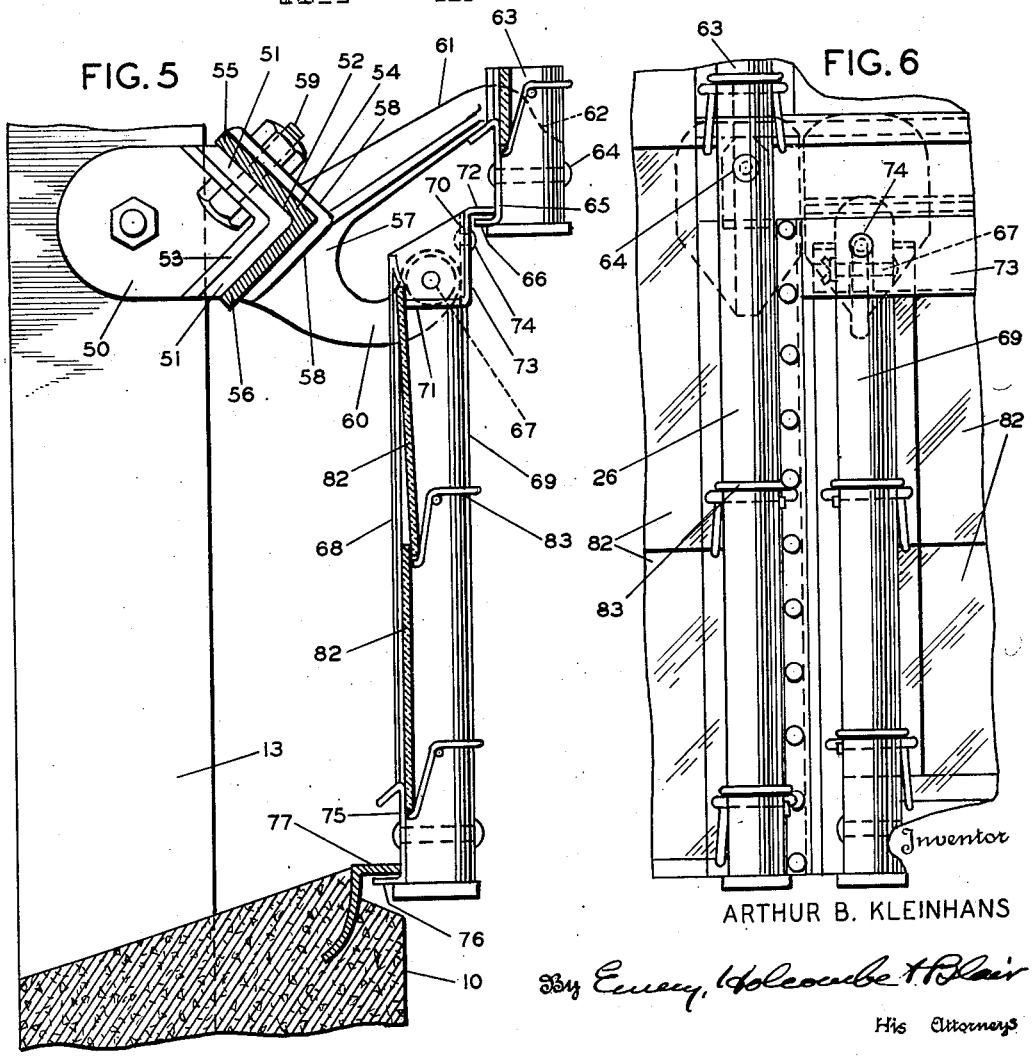
ARTHUR B. KLEINHANS

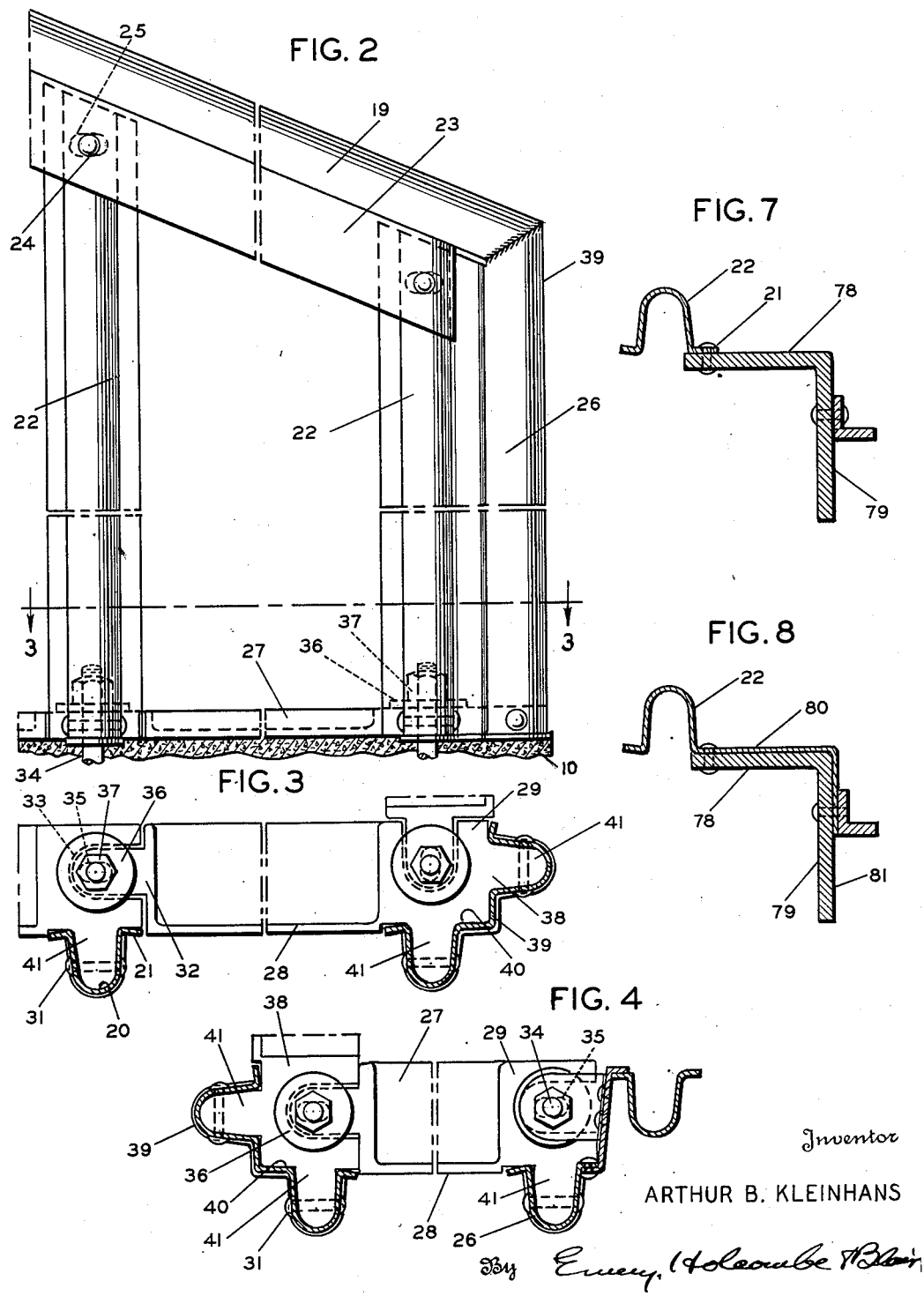

Patented May 19, 1953

UNITED STATES PATENT OFFICE 2,639,009

GREENHOUSE CONSTRUCTION

Arthur B. Kleinhans, Easton, Pa.; Millicent B. Kleinhans, executrix of said Arthur B. Kleinhans, deceased, assignor to Lord & Burnham Division of Burnham Corporation, Irvington, N. Y.

Application February 5, 1947, Serial No. 726,511

4 Claims. (Cl. 189—4)

This invention relates to greenhouses and is particularly directed to an all metal framework for supporting a sheathing of glass panes.

Heretofore, greenhouse construction has been practically limited to wood framework, which presents certain unsatisfactory features. Wood framing in greenhouses presents serious maintenance problems, principally because of the necessity for painting the wood to preserve it. Due to the fragile nature of a greenhouse sheathing, and the reticulated character of the wood sash, painting is tedious and time-consuming, and therefore is expensive. Wood also is subject to disadvantages such as swelling and warping, and is bulky, so that wood sash cuts off a great deal of light from the interior of the greenhouse. Some proposals have been made to substitute metal frames for wooden ones, but such frames have been impractical and unsatisfactory, chiefly because the high expansion coefficient of metal causes breakage of the glass and warping and twisting of the framework.

The principal object of the invention is to provide a satisfactory, all metal greenhouse framework, having novel structural arrangements that accommodate expansion and contraction changes, and relative changes between glass panes and metal supporting structure due to their different coefficients of expansion.

Another object is to provide an extremely simple and inexpensive supporting framework, yet one that will be entirely satisfactory from the viewpoint of plant care, and which will be long-lived and require little maintenance.

Another object is the arrangement of such a simple and inexpensive framework to provide openable panels in the walls for adequate ventilation. Still another object is to provide a simple supporting arrangement interposed between the foundation and lower wall and vertical, panel-supporting astragals to permit the latter to move laterally to accommodate variations due to expansion and contraction of the framework.

Inexpensive metal greenhouse frame construction presents certain problems. It is desirable to have foundation walls extend upward approximately as high as the plant supporting benches, and to mount on the foundation walls a simple metallic framework that supports the glass panes forming the upper wall fabric. Provision must be made for accommodating changes of dimension of the glass panes and framework by expansion and contraction. Certain panels of panes must be movable to provide for ventilation, and mechanism must be provided for controlling the positions of these panes. Such mechanism should be so located relative to the arrangement plan of the benches and aisles as not to present the possibility of damage to plants by moving parts, and desirably should be so arranged as not to interfere with attendants working at the benches or moving in the aisles.

Due to its rust-proof qualities, and its lightness, as well as its capacity for manufacture by extrusion methods, aluminum and its alloys are ideal material for glass-supporting outer framework, in the form of astragals, upon which the glass panes are supported. Manufacture of the complete frame form from such material, however, is impractical due to strength limitations and expense of sections capable of carrying the large loads imposed upon main supporting elements in greenhouses. For these reasons, the present greenhouse skeleton, or framework, comprises a main, load-bearing framework of steel or other metal of high load-bearing capacity, and an outside pane-carrying framework of rust-proof, light-weight metal, such as aluminum or one of its alloys. Such a structure presents problems of avoiding injury due to difference in coefficients of expansion of steel, the light, rust-proof metal, and glass, and that of accommodating expansion and contraction of frame structure of long length and wide span.

The greenhouse disclosed herein is constructed as a series of sections or bays, the central one being firmly anchored and those on either side being tied to it by expansion joints, both between the center bay and those immediately adjacent, and between the relatively adjacent bays throughout the end portion of the building.

In the accompanying drawings:

Fig. 1 is a cross-section of a greenhouse embodying the invention;

Fig. 2 is a fragmentary detail end view of a portion of such a greenhouse;

Fig. 3 is a horizontal sectional view on line 3—3 of Fig. 2;

Fig. 4 is a horizontal sectional view similar to Fig. 3 taken through the corner and adjacent parts of the adjoining side and end walls.

Fig. 5 is a fragmentary vertical sectional view showing details of a pivoted ventilating panel assembly and its supporting structure, forming part of the sidewall.

Fig. 6 is a fragmentary side elevation of adjacent edges of a fixed section and a pivoted ventilating section of a sidewall;

Fig. 7 is a sectional view on line 7—7 of Fig. 1, showing a door frame arrangement;

Fig. 8 is a sectional view similar to Fig. 7, showing a modified form of door frame.

Describing the drawings in detail, the lower part of the greenhouse wall structure is composed of a foundation wall 10 that extends vertically a suitable height, for example, to approximately the level of plant benches that may be arranged inside the structure. Upon this foundation wall 10 are supported end walls 11 and side walls 12, the former comprising fixed panels of supporting elements and glass panes, and the side walls including end sections of fixed panels, similar to the end walls, and intermediate sections horizontally divided into upper parts made up of fixed panels and lower parts including pivoted ventilating panels that may be swung open to admit air.

The greenhouse comprises a main frame including studs 13 along the sides, having their lower ends embedded in the sidewall reaches of the foundation 10 and supporting rafters 14. A ridgepole assembly 15, the details of which are disclosed in my companion application, Serial No. 728,539, now Patent No. 2,463,183, connects the rafters, and additional support is afforded by stringers 16 and auxiliary studs 17 having their lower ends embedded in footing blocks 18. Transverse, inclined astragals 19 are supported on the stringers 16 and to these astragals the panes of glass of the roof are fixed by suitable spring clips.

An inexpensive and easily erected structure is used for the end walls and the end sections of fixed panels of the side walls. This structure comprises a series of vertical astragals that extend between the foundation wall 10 and the roof structure. These astragals may be in the form of channel strips, including channel-forming walls 20 and laterally extending flanges 21. The upper ends of astragals 22 of the end walls 11 are secured to the end astragals 19 of the roof by skirts 23 that depend below the roof and overlie the apices of the astragals, being secured by rivets 24 penetrating the skirt and slots 25 in the astragals, which slots are elongated in the longitudinal direction of the wall in which they are supported. The fixed astragals 26 of the side walls are welded at their upper ends to the inclined astragals 19 of the roof, so are free to move with said inclined astragals, the latter being secured at their upper ends to the ridge pole by pivoted joints as disclosed in my Patent No. 2,463,183.

In order that the bottom ends of the fixed vertical astragals 22 and 26 may move in similar manner to the top ends, as above described, they are supported out of contact with the foundation wall 10 by interposed structure providing the necessary freedom of movement. Each astragal is supported by an individual sill plate 27. These plates 27, which overlie the top surface of the foundation wall 10 as shown in Figure 2, are flat and have thickened edges 28 and thickened end portions 29, one of which end portions is provided with a laterally projecting tongue 41 that extends horizontally beyond the outer surface of the foundation wall. An astragal is supported upon each such tongue 41, which extends into the channel and contacts the inner surface of the astragal wall 20 as shown in Figures 3 and 4, a rivet 31 horizontally penetrating the astragal and tongue 41. The opposite ends of the plates 27 respectively are provided with axially projecting tongues 32 and axial slots 33, which interfit freely to permit relative movement between the plates, and thus between the astragals that they respectively support. Studs 34 project from the wall 10 in which their lower portions are embedded, through openings 35 in the tongues that are elongated sufficiently to permit the necessary movement relative to the wall. Washers 36 of sufficient diameter to overlie the plate structure at the sides of the slots 33, as well as the tongues 32, are pressed down on the plates by nuts 37 with sufficient firmness to secure the plates parallel to the wall, yet permitting sliding of the plates relative to each other and to the wall as necessitated by temperature changes.

Fig. 3 discloses a plate 27 having its end 38 specially formed to support a corner post 39, which differs from the astragals 22 and 26 only in including two right-angularly related channels connected by a web 40. The plate end 38 includes tongues 41 disposed for engaging with both of the channels of the corner member.

The described structure for supporting fixed panels is extended from the corners between end side walls for limited distances along the side walls, and between these fixed panel side wall sections are intermediate sections including pivoted panels that can be swung open to provide ventilation. The structure of these ventilating side wall sections is as follows:

On the studs 13 are mounted brackets 50, which may be bolted to the sides of the studs, and which project beyond the outer surfaces of the studs where the brackets are provided with angularly related flanges 51, providing upper and lower plane outer surfaces 52 and 53 angularly related to each other, as well as to the horizontal and the vertical, and that extend longitudinally of the wall structure. Supported on the ends of the brackets 50 is an angle stringer beam 54 having flanges 55 and 56 of which the inner surfaces are arranged in angular relation to engage the surfaces 52 and 53. Brackets 57 having supporting flanges 58 angularly related to engage the outer surfaces of the stringer beam 54 are secured to the stringer beam. Bolts 59 penetrate the upper flanges of the bracket 50, the beam 54 and the bracket 57 and secure the assembly together. The brackets 57 may be spaced as required along the stringer 54, by bolts penetrating the upper flanges 55 and 58 of the beam and bracket respectively, generally similar to the bolts 59.

The brackets 57 project outward from the stringer beam 54, and are bifurcated, having lower arms 60 that extend beyond the planes of the outer surface of the foundation wall 10 and upper arms 61 projecting outwardly beyond and above the ends of the arms 60. The upper arms 61 terminate in enlargements 62 that engage in the bottom ends of the channels of fixed vertical astragals 63, the upper ends of the astragals being welded to the roof astragals similar to the astragals 26. Fixed to the inner surfaces of the lower ends of the astragals 63, by rivets 64 that penetrate the walls of the astragals and the enlargements 62 of the bracket arms, is a horizontal rail 65, having its lower edge flanged at 66.

The lower arms 60 of the brackets 57 carry pivot pins 67 on which are mounted ventilating panels 68 for upward and outward swinging. These panels include vertical pane-supporting channeled astragals 69, in the channels of which the ends of the bracket arms 60 are positioned and through the walls of which the pins 67 penetrate. An upper rail 70 is riveted to the top ends of the astragals to stop the space between the astragals 69, and to cooperate with the rail 65 to form a close joint when the panel is in its closed vertical position. The rail comprises a lower flange 71 extended longitudinally between astragals 69 and the edge of which contacts a glass pane supported in the panel, a top flange 72 that overlies the flange 66 when the panel is closed, and a web 73 connecting the two flanges and riveted at 74 to the astragals.

At the lower end of the ventilating panel a horizontal rail 75 is riveted to the astragals, such rail being provided with a bottom flange 76 that cooperates with a stop 77 inserted in the foundation wall 10.

It will be noted that the pivot pin 67 is located at a position spaced inwardly and below the end of the upper bracket arm 61, so that the rail 70 of the swinging panel may cooperate with the rail 65 of the vertically adjacent fixed panel. The pivot pin 67 also is located outside the plane of the outer surface of the foundation wall 10, so that the lower rail may cooperate with the top 77.

A door frame is illustrated in Fig. 7. This frame comprises a simple rectangular frame of angle bars having flanges 78 that lie parallel to the end wall 11 and flanges 79 framing the opening. Flanges 21 of astragals 22 are riveted to the marginal portions of the arms 78. In the modified form of door frame shown in Fig. 8, the flange of the astragal adjacent the frame is extended to form a sheathing 80 for the outer surface of the arm 78, and the outer portion of the surface 81 that is exposed in the door opening.

As illustrated in Figs. 5 and 6, glass panes 82 are supported on the astragals by wire clips 83 that serve to press the panes against the flanges 21 of the astragals, and that support the lower edges of the panes.

In both the fixed and ventilating wall structures, it is to be noted that the astragals are supported outside the periphery of the foundation wall, and out of contact with it. This serves two purposes, one being to permit relative movement of the astragals to accommodate expansion and contraction in either the metallic framework or the glass panes, without imposing breaking stresses in the panes, the other being to insure the drainage of water from exterior surfaces to the outside of the foundation.

The side wall structure presents the noted advantages arising from support of the panel structure outside the foundation wall, and provides a simple structure for so supporting the panels, and at the same time providing pivotal mounting for the ventilating panels. The particular dispositions of the parts forming this structure avoids the presence of horizontal surfaces upon which water might collect. Additionally the arrangement of the studs and the outwardly spaced panels provides for use of an operating system of the type disclosed in applicant's copending application, Serial No. 726,512, filed February 5, 1947 and now Patent No. 2,573,340, dated October 30, 1951, with the attendant advantages therein noted.

In a greenhouse comprising plural bays, interconnection of adjacent bays is accomplished by expansion joints between the longitudinal members 54, and suitable roofing joints that permit movement between roofs of adjacent bays. These joints form no part of the present invention, it being sufficient to note that the structure above described lends itself to construction of multiple bay greenhouses in the manner indicated.

I claim:

1. In a greenhouse including a masonry foundation wall and vertical astragals comprising inwardly open channel strips; means supporting the astragals providing for horizontal movement thereof to accommodate expansion of panels supported between them, said means comprising plural sill plates supported on the top of the foundation wall, each of said plates having a single laterally projecting tongue extending into and secured to an astragal, and supporting said astragal out of contact with the foundation wall, the sill plates being provided with tongue and slot structure that slidably interfit in adjacent plates, studs mounted in the foundation wall and extending vertically through holes in the said tongues, and securing means mounted on the studs and overlying the tongue and slot structure to permit their relative movement.

2. A metallic greenhouse wall structure comprising spaced vertical studs, spaced brackets supported by and projecting outwardly of the outer surfaces of the studs, pane supporting astragals supported by said brackets and spaced away from said studs and upper side wall panes supported thereby, a horizontal rail extended between and supported by the upper parts of the bracket ends, and a pane-supporting panel supported thereby inside of said upper wall panes, said pane supporting panel being pivoted below its upper edge for upward and outward swinging upon a horizontal axis spaced below and inwardly of the rail and the upper edge thereof extending upwards between lower parts of the bracket ends, whereby the upper edge of said panel forms a closure joint with said rail when swung to closed position.

3. A metallic greenhouse wall structure comprising spaced vertical studs, bracket structure supported by said studs and including horizontally spaced brackets projected outwardly beyond the outer surfaces of the studs and having vertically spaced bifurcated end structures, pane supporting astragals supported by said brackets and spaced away from said studs and upper side wall panels supported thereby, a horizontal rail supported by the upper arm of said bifurcated ends, and a pane supporting panel supported thereby inside of said upper wall panes, said pane supporting panel being pivoted below its upper edge on a horizontal axis between the lower arms of said bracket ends, the upper part of said panel above the pivot axis forming a closure joint with said rail when the panel is swung to closed position.

4. In a greenhouse wall, supporting structure comprising spaced vertical studs, inner brackets projecting laterally outward from said studs and having upper and lower plane end surfaces angularly related to each other and inclined to the horizontal and to the vertical, a horizontal angle beam secured to said brackets with its inner surfaces against said end surfaces thereof and its outer surfaces inclined away from said studs, outer brackets having inner end surfaces respectively engaging said outer surfaces of the angle beam and projecting outwardly therefrom, and pane-supporting structure mounted on said outer brackets.

ARTHUR B. KLEINHANS.

References Cited in the file of this patent

UNITED STATES PATENTS

| Number | Name | Date |
|---|---|---|
| 648,749 | Jennings | May 1, 1900 |
| 884,208 | Rice | Apr. 7, 1908 |
| 1,633,446 | Kleinhans | June 21, 1927 |
| 1,675,719 | Macdonald | July 3, 1928 |
| 1,781,517 | McKeown | Nov. 11, 1930 |
| 2,042,179 | Leake | May 26, 1936 |
| 2,111,634 | Kotrbaty | Mar. 22, 1938 |
| 2,122,005 | Foley, Jr. | June 28, 1938 |
| 2,159,735 | Gast | May 23, 1939 |
| 2,333,219 | Weeber | Nov. 2, 1943 |